(12) United States Patent
Bae

(10) Patent No.: US 9,531,444 B2
(45) Date of Patent: Dec. 27, 2016

(54) WIRELESS POWER RECEIVER AND METHOD OF MANAGING THEREOF

(71) Applicant: LG Innotek Co., Ltd., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/507,239

(22) Filed: Oct. 6, 2014

(65) Prior Publication Data

US 2015/0022149 A1 Jan. 22, 2015

Related U.S. Application Data

(63) Continuation of application No. 13/767,549, filed on Feb. 14, 2013.

(30) Foreign Application Priority Data

Feb. 21, 2012 (KR) .................. 10-2012-0017295
Mar. 5, 2012 (KR) .................. 10-2012-0022239

(51) Int. Cl.
*H04B 5/00* (2006.01)
*H02J 5/00* (2016.01)
*H02J 7/02* (2016.01)
*H02J 17/00* (2006.01)
*H02M 7/06* (2006.01)
*H01F 38/14* (2006.01)
*H02J 1/02* (2006.01)
*H02M 7/46* (2006.01)

(52) U.S. Cl.
CPC ............ *H04B 5/0037* (2013.01); *H01F 38/14* (2013.01); *H02J 1/02* (2013.01); *H02J 5/005* (2013.01); *H02J 7/025* (2013.01); *H02J 17/00* (2013.01); *H02M 7/06* (2013.01); *H02M 7/46* (2013.01); *H04B 5/00* (2013.01); *H04B 5/0093* (2013.01)

(58) Field of Classification Search
CPC ........................................... H04B 5/00
USPC ........................................... 307/104
See application file for complete search history.

(56) References Cited

U.S. PATENT DOCUMENTS

| 5,479,336 A * | 12/1995 | Motoki ............... H02M 1/4208 323/210 |
| 8,111,042 B2 | 2/2012 | Bennett |
| 2005/0068019 A1* | 3/2005 | Nakamura et al. .......... 323/355 |
| 2005/0083020 A1* | 4/2005 | Baarman ...................... 320/166 |
| 2005/0110463 A1 | 5/2005 | Patino et al. |

(Continued)

FOREIGN PATENT DOCUMENTS

| CN | 102055250 A | 5/2011 |
| CN | 102084442 A | 6/2011 |

(Continued)

*Primary Examiner* — Adi Amrany
(74) *Attorney, Agent, or Firm* — BIrch, Stewart, Kolasch & Birch, LLP

(57) ABSTRACT

A receiver to wirelessly receive power from a transmitter, and including a receiving unit to receive AC power from the transmitter; a rectifying unit to rectify the received AC power to DC power, a power management unit to manage power to be transferred to a load based on the rectified DC power and a DC-DC converter to supply a DC voltage required by the load, or to the load with the rectified DC power. The power management unit generates and transmits a control signal to adjust the power transferred to the load based on the rectified DC power.

16 Claims, 7 Drawing Sheets

(56) References Cited

U.S. PATENT DOCUMENTS

| | | |
|---|---|---|
| 2006/0066286 A1* | 3/2006 | Yokota et al. ............... 320/134 |
| 2006/0152877 A1* | 7/2006 | Buzzard et al. .............. 361/118 |
| 2006/0197493 A1 | 9/2006 | Kim et al. |
| 2009/0096413 A1 | 4/2009 | Partovi et al. |
| 2009/0251099 A1 | 10/2009 | Brantner et al. |
| 2010/0036773 A1* | 2/2010 | Bennett ........................ 705/67 |
| 2010/0066176 A1 | 3/2010 | Azancot et al. |
| 2010/0165686 A1* | 7/2010 | Matzberger ........... H02M 7/219 363/127 |
| 2010/0284114 A1* | 11/2010 | Kilroy et al. .................... 361/86 |
| 2010/0295506 A1 | 11/2010 | Ichikawa |
| 2011/0109263 A1 | 5/2011 | Sakoda et al. |
| 2011/0231029 A1 | 9/2011 | Ichikawa et al. |
| 2012/0050931 A1* | 3/2012 | Terry ...................... H02H 9/04 361/91.5 |
| 2012/0098330 A1 | 4/2012 | Ichikawa et al. |
| 2012/0194201 A1* | 8/2012 | Saloio ................... G01R 27/26 324/537 |
| 2012/0212178 A1 | 8/2012 | Kim |
| 2012/0223591 A1* | 9/2012 | Cheon .................... H02J 5/005 307/104 |
| 2012/0293009 A1* | 11/2012 | Kim ..................... H02H 7/1252 307/104 |
| 2012/0306269 A1* | 12/2012 | Kim ........................ H02J 7/025 307/11 |
| 2012/0309306 A1* | 12/2012 | Kim ..................... H04B 5/0031 455/41.1 |
| 2013/0009650 A1* | 1/2013 | Sakakibara ............... B60L 3/00 324/546 |
| 2013/0062965 A1* | 3/2013 | Chernokalov ....... H04B 5/0037 307/104 |
| 2013/0119774 A1 | 5/2013 | Ichikawa |
| 2013/0193913 A1 | 8/2013 | Takada et al. |
| 2014/0103872 A1 | 4/2014 | Ichikawa |
| 2014/0125147 A1 | 5/2014 | Azancot et al. |

FOREIGN PATENT DOCUMENTS

| | | |
|---|---|---|
| JP | 2008-99352 A | 4/2008 |
| JP | 2012044762 A * | 3/2012 |
| JP | 2012165510 A * | 8/2012 |
| KR | 10-0859445 B1 | 9/2008 |
| KR | 10-0903464 B1 | 6/2009 |
| KR | 10-1065738 B1 | 9/2011 |
| TW | I287697 B | 10/2007 |
| TW | M355451 U | 4/2009 |
| TW | 201110808 A1 | 3/2011 |
| WO | WO 2012/007942 A2 | 1/2012 |

* cited by examiner

| | Switching regulator | LDO Linear Regulator | Power managing unit (370) |
|---|---|---|---|
| Structure | Complex (Large inductor is required) | Simple | Simple |
| Cost | Expensive($1.0) | Economical($0.4) | Economical($0.5) |
| Efficiency | About 90% | About 80% | About 95% |

WIRELESS POWER RECEIVER AND METHOD OF MANAGING THEREOF

CROSS REFERENCE TO RELATED APPLICATION

This application is a Continuation of co-pending U.S. patent application Ser. No. 13/767,549 filed on Feb. 14, 2013, which claims the benefit of Korean Patent Application Nos. 10-2012-0017295, filed on Feb. 21, 2012 and 10-2012-0022239, filed on Mar. 5, 2012. The contents of all of these applications are hereby incorporated by reference as fully set forth herein in their entirety.

BACKGROUND

The disclosure relates to a wireless power transmission technology. In more particular, a wireless power receiver, capable of maximizing the power transmission efficiency in power transmission, and a method of managing the power thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmitting technologies, an energy transmitting scheme employing resonance has been widely used.

In a wireless power transmission system employing resonance, since an electrical signal generated between the wireless power transmitter and the wireless power receiver is wirelessly transferred through coils, a user may easily charge electronic appliances such as a portable device.

However, as the typical wireless power receiver employs a DC-DC converter, the wireless power receiver may not overcome the problem relaed to the power transmission efficiency and the cost problem resulting from the size.

SUMMARY

The disclosure provides a wireless power receiver capable of increasing the efficiency of the power transmission between a wireless power transmitter and the wireless power receiver, reducing the cost of a wireless power transmission system, and reducing the whole size of the wireless power transmission system, and a method of managing power thereof.

The disclosure provides a wireless power receiver capable of minimizing the power loss and a method of managing power thereof.

The disclosure provides a wireless power receiver capable of adjusting the power transmitted to a load by detecting the power supplied to the load and transmitting state information of the detected power to the transmitter, and a method of managing power thereof.

The disclosure provides a wireless power receiver capable of preventing over voltage from being applied to a load through the detection of power transmitted to the load to protect the load, and a method of managing power thereof.

According to one embodiment, there is provided a wireless power receiver to wirelessly receive power from a wireless power transmitter and transmit the power to a load. The wireless power receiver includes a receiving unit to receive AC power from the wireless power transmitter that receives power from a power supply device, a rectifying unit to rectify the received AC power to DC power, and a power managing unit to manage the power transmitted to the load based on the rectified DC power.

According to one embodiment, there is provided a method of managing power in a wireless power receiver to wirelessly receive power from a wireless power transmitter and transmit the power to a load. The method includes receiving AC power from the wireless power transmitter receiving power from a power supply device, rectifying the AC power to DC power, and managing power transmitted to the load based on the rectified DC power.

The embodiments have the following effects.

First, the efficiency of the power transmission between a wireless power transmitter and the wireless power receiver can be increased, the cost of a wireless power transmission system can be reduced, and the whole size of the wireless power transmission system can be reduced.

Second, the power loss can be minimized by using the power managing unit instead of the DC-DC converter.

Third, the power supplied to the load is detected, and the state of the detected power is transmitted to the wireless power transmitter, so that the adjusted power can be supplied to the load.

Fourth, the power supplied to the load is detected, thereby preventing the over voltage from being applied to the load to protect the load.

Meanwhile, any other various effects will be directly and implicitly described below in the description of the embodiment.

DETAILED DESCRIPTION OF THE EMBODIMENTS

Hereinafter, the exemplary embodiments will be described with reference to accompanying drawings in detail so that those skilled in the art can easily realize the embodiments.

Figure 1:
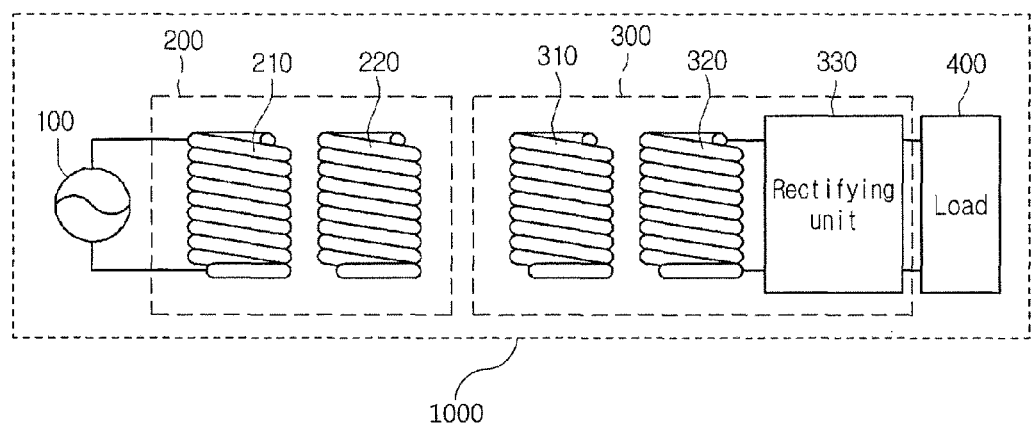
FIG. 1 is a view showing a wireless power transmission system according to one embodiment.

FIG. 1 a circuit diagram showing a resonance-type wireless power transmission system 1000 according to the embodiment.

Referring to FIG. 1, the wireless power transmission system 1000 may include a power supply device 100, a wireless power transmitter 200, a wireless power receiver 300 and a load side 400.

According to one embodiment, the power supply device 100 may be included in the wireless power transmitter 200.

The wireless power transmitter 200 may include a transmission induction coil 210 and a transmission resonant coil 220.

The wireless power receiver 300 may include a reception resonant coil 310, a reception induction coil 320, and a rectifying unit 330.

Both terminals of the power supply device 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power supply device 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply device 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiver 300, which makes a resonance circuit with the wireless power transmitter 200, through resonance.

Power can be transmitted between two LC circuits, which are impedance-matched with each other, through resonance. The power transmitted through the resonance can be farther transmitted with higher efficiency when comparing with the power transmitted by the electromagnetic induction.

The reception resonant coil 310 receives power from the transmission resonant coil 220 through the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying unit 330 and transmitted to the load 400.

The transmission induction coil 210, the transmission resonant coil 220, the reception resonant coil 310, and the reception induction coil 320 may have the shape of a circle, an oval, or a rectangle, but the embodiment is not limited thereto.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

According to the embodiment, when the wireless power transmission system performs power transmission based on the electromagnetic induction, the wireless power transmitter 200 does not include the transmission resonant coil 220, and the wireless power receiver 300 does not include the reception resonance coil 310.

A quality factor and a coupling coefficient are important in the wireless power transmission. In other words, the power transmission efficiency can be gradually improved as the values of the quality factor and the coupling coefficient are increased.

The quality factor may refer to an index of energy that may be stored in the vicinity of the wireless power transmitter 200 or the wireless power receiver 300.

The quality factor may vary according to the operating frequency ω as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity. The power transmission efficiency between the wireless power transmitter 200 and the wireless power receiver 300 can be improved as the value of the quality factor is increased.

The coupling coefficient represents the degree of inductive magnetic coupling between a transmission coil and a reception coil, and has a value of 0 to 1.

The coupling coefficient may vary according to the relative position and the distance between the transmission coil and the reception coil.

Figure 2:
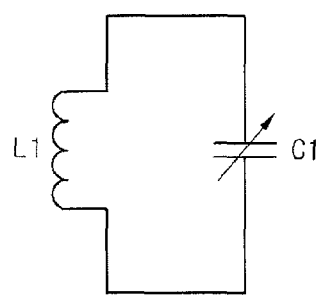
FIG. 2 is a circuit diagram showing an equivalent circuit diagram of a transmission induction coil according to one embodiment.

FIG. 2 is a circuit diagram showing an equivalent circuit of the transmission induction coil 210 according to the one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuit of the transmission resonant coil 220, the reception resonant coil 310 and the reception induction coil 320 may be the same as the equivalent circuit shown in FIG. 2.

Figure 3:
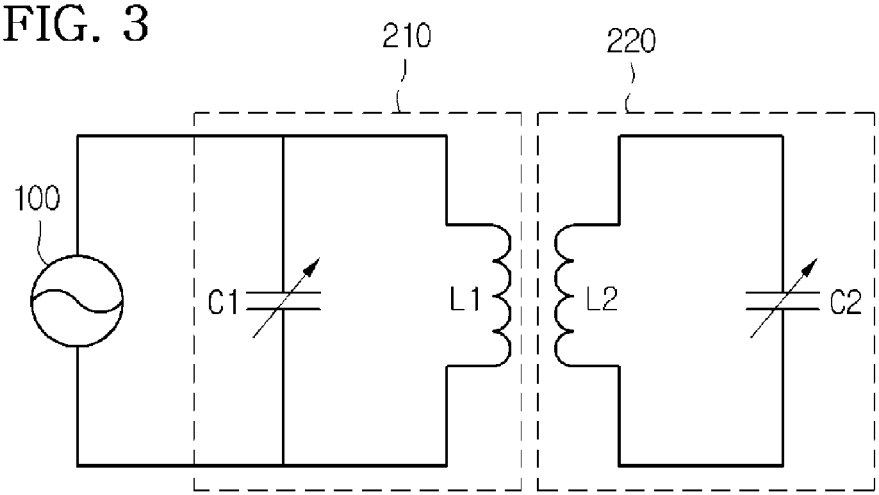
FIG. 3 is a circuit diagram showing an equivalent circuit of the power supply device and the wireless power transmitter according to one embodiment.

FIG. 3 is a circuit diagram showing an equivalent circuit of the power supply device 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
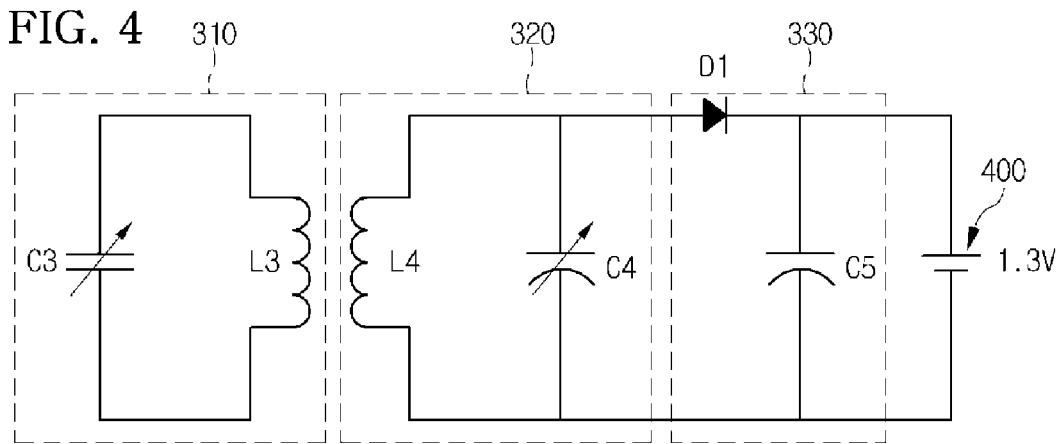
FIG. 4 is a circuit diagram showing an equivalent circuit of the wireless power receiver according to one embodiment.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying unit 330 may transfer DC power to the load 400 by converting AC power received from the reception induction coil 320 into the DC power.

In detail, the rectifying unit 330 may include a rectifier and a smoothing circuit. According to one embodiment, the rectifier may include a silicon rectifier and may be equivalent as a diode D1 as shown in FIG. 4.

The rectifier can convert AC power received from the reception induction coil 320 into the DC power.

The smoothing circuit can output smooth DC power by removing AC components included in the DC power converted by the rectifier. According to one embodiment, as shown in FIG. 4, the smoothing circuit may include a rectifying capacitor C5, but the embodiment is not limited thereto.

The load 400 may be a predetermined rechargeable battery or a device requiring the DC power. For example, the load 400 may refer to a battery.

The wireless power receiver 300 may be installed in an electronic device, such as a cellular phone, a laptop computer or a mouse, requiring the power. Accordingly, the reception resonant coil 310 and the reception induction coil 320 may have the shape suitable to the shape of the electronic device.

The wireless power transmitter 200 may interchange information with the wireless power receiver 300 through in-band communication or out-of-band communication.

The in-band communication refers to the communication for interchanging information between the wireless power transmitter 200 and the wireless power receiver 300 through a signal having the frequency used in the wireless power transmission. The wireless power receiver 300 may further include a switch and may receive or may not receive power transmitted from the wireless power transmitter 200 through a switching operation of the switch. Accordingly, the wireless power transmitter 200 can recognize an on-signal or an off-signal of the switch included in the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch may be connected to the resistor in series. According to one embodiment, the state information of the wireless power receiver 300 may include information about the present charge quantity in the wireless power receiver 300 and the change of the charge quantity.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, the wireless power transmitter 200 may include a resistor and a switch to transmit the state information of the wireless power transmitter 200 to the wireless power receiver 300. According to one embodiment, the state information of the wireless power transmitter 200 may include information about the maximum quantity of power to be supplied from the wireless power transmitter 200, the number of wireless power receivers 300 receiving the power from the wireless power transmitter 200 and the quantity of available power of the wireless power transmitter 200.

Hereinafter, the out-of-band communication will be described.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

The wireless power receiver 300 according to the embodiment and the wireless power transmission scheme thereof will be described with reference to FIGS. 5 to 9 as well as FIGS. 1 to 4.

Figure 5:
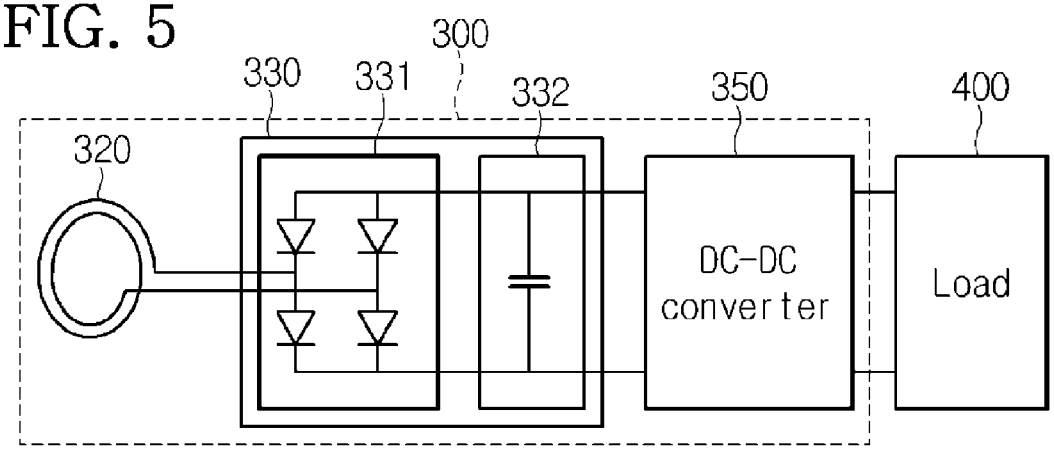
FIG. 5 is a block diagram showing a wireless power receiver according to another embodiment.

FIG. 5 is a block diagram showing the wireless power receiver 300 according to another embodiment.

According to the embodiment, it is assumed that the load 400 is separately provided from the wireless power receiver 300.

The wireless power receiver 300 may transmit power, which has been received therein from the wireless power transmitter 200, to the load 400.

Referring to FIG. 5, the wireless power receiver may include the reception induction coil 320, the rectifying unit 330, and the DC-DC converter 350. According to the embodiment, if the wireless power receiver 300 receives power from the wireless power transmitter 200 through the resonance, the wireless power receiver 300 may further include the reception resonant coil 310. According to the embodiment, if the wireless power receiver 300 receives power from the wireless power transmitter 200 through the electromagnetic induction, the wireless power receiver 300 may not include the reception resonant coil 310.

The reception resonant coil 320 receives power from the wireless power transmitter 200. In detail, the reception resonant coil 320 may receive power through the electromagnetic induction or resonance. The power received in the reception induction coil 320 may be AC power.

The rectifying unit 300 may convert the AC power received in the reception resonant coil 320 into DC power.

The rectifying unit 330 may include a rectifier 331 and a smoothing circuit 332.

The rectifier 331 may include at least one diode. According to the embodiment, the diode may refer to a silicon diode. According to one embodiment, although the rectifier 331 may perform a rectifying function by using one diode, the rectifying unit 331 may have the structure in which at least one diode is preferably arranged. As shown in FIG. 5, the rectifier 331 may include a bridge diode. The bridge diode structure is a circuit structure in which four diodes are connected to each other to perform a rectifying function.

The rectifier 331 performs a rectifying function of converting received AC power into DC power. According to the embodiment, since the power is proportional to voltage or current, it is assumed that power, voltage, and current have the same concept for the convenience of explanation. The rectifying function refers to a function allowing current to flow only in one direction. In other words, the forward resistance of the rectifier 331 is low, and the reverse resistance of the rectifier 331 is sufficiently great, so that current may flow only in one direction.

The smoothing circuit 332 may output the stable DC current by removing a ripple component from the DC output power of the rectifier 331.

The smoothing circuit 332 may include a capacitor for smoothing.

The DC-DC converter 350 may output DC voltage rectified by boosting up or dropping down converted AC voltage after converting the DC voltage output from the smoothing circuit 332 into the AC voltage.

The DC-DC converter 350 may include a switching regulator or a linear regulator.

The linear regulator is a converter to receive input voltage, provide output voltage by a required quantity, and discharge remaining voltage as heat.

The switching regulator is a converter to adjust output voltage through a pulse width modulation (PWM) scheme.

The DC-DC converter 350 may supply DC voltage, which is required by the load 400, to the load 400.

However, since the DC-DC converter 350 represents 85% of power transmission efficiency, about 15% of efficiency loss may occur.

In addition, since the impedance, which is obtained when seen from the input terminal of the DC-DC converter 350 toward the load 400, may be varied, the power transmission efficiency may be lowered. The details thereof will be described below with reference to FIG. 6.

Figure 6:
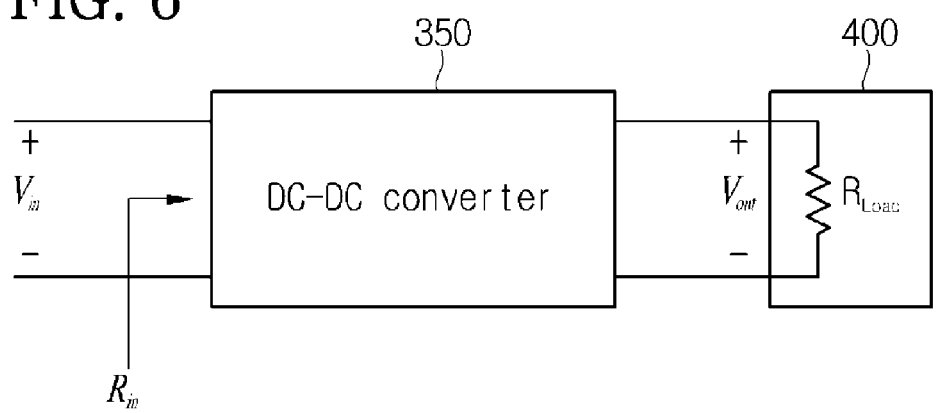
FIG. 6 is a view showing the variation of the impedance obtained when seen from the input terminal of a DC-DC converter of FIG. 5 to the load.

FIG. 6 is a view to explain the change of impedance obtained when seen from the input terminal of the DC-DC converter 350 of FIG. 5 toward the load 400.

Referring to FIG. 6, on the assumption that a real impedance of the load 400 is marked as reference sign RL, an input impedance Rin, which is obtained when seen from the input terminal of the DC-DC converter 350 toward the load 400, may be expressed as Equation 1.

$$R_{in} = E_d \left( \frac{V_{in}}{V_{out}} \right)^2 R_L \quad \text{[Equation 1]}$$

In Equation 1, Ed refers to the conversion efficiency of the DC-DC converter 350, Vout refers to output voltage applied to the impedance RL of the load 400, and Vin refers to the input voltage of the DC-DC converter 350. According to the embodiment, the load 400 may include a battery, but the embodiment is not limited thereto.

On the assumption that the output voltage Vout, the impedance RL of the load 400, and the conversion efficiency Ed are constant, the input impedance Rin is varied according to the input voltage Vin applied to the DC-DC converter 350. If the input impedance Rin is varied, the power transmission efficiency between the transmitter and the receiver may be degraded.

Hereinafter, the structure of the wireless power receiver 300 representing the improved power transmission efficiency between the transmitter and the receiver will be described with reference to FIG. 7.

Figure 7:
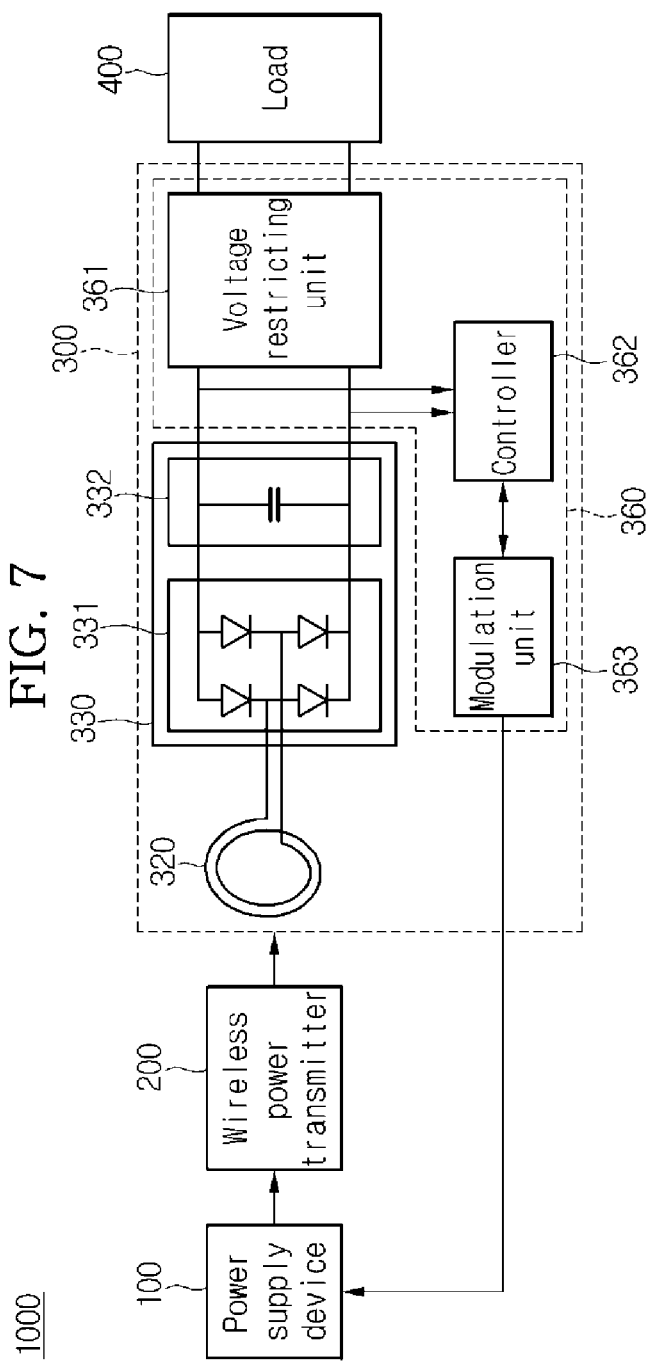
FIG. 7 is a block diagram showing a wireless power transmission system including a wireless power receiver according to still another embodiment.

FIG. 7 is a block diagram showing the wireless power transmission system 1000 including the wireless power receiver 300 according to another embodiment.

The power supply device 100 and the wireless power transmitter 200 have the same as the power supply device and the wireless power transmitter of FIGS. 1 to 4.

Referring to FIG. 7, the wireless power receiver 300 may include the reception induction coil 320, the rectifying unit 330, and a power managing unit 360.

According to one embodiment, if the wireless power receiver 300 receives power from the wireless power transmitter 200 through the resonance, the wireless power receiver 300 may further include the resonance resonant coil 310 which has been described with reference FIGS. 1 to 4. According to one embodiment, if the wireless power receiver 300 receives power from the wireless power transmitter 200 through the electromagnetic induction, the wireless power receiver 300 may not include the reception resonant coil 310.

The reception induction coil 320 receives power from the transmitter. In detail, the reception induction coil 320 may receive power through the electromagnetic induction or the resonance. The power received in the reception induction coil 320 may include AC power.

The rectifying unit 330 may convert the AC power received in the reception induction coil 320 into DC power.

The rectifying unit 330 may include the rectifier 331 and the smoothing circuit 332.

The rectifier 331 may include at least one diode. According to the embodiment, the diode may refer to a silicon diode. According to one embodiment, although the rectifier 331 may perform a rectifying function by using at least one diode, the rectifier 331 may have preferably the structure in which at least one diode is arranged. As shown in FIG. 5, according to one embodiment, the rectifier 331 may include a bridge diode. The bridge diode has the circuit structure in which four diodes are connected to each other to perform a rectifying function.

The rectifier 331 performs a rectifying function to convert the received AC power into the DC power. According to the embodiment, since power is proportional to voltage or current, it is assumed that power, voltage, and current have the same concept. The rectifying function refers to a function allowing current to flow only in one direction. In other words, the forward resistance of the rectifier 331 is low, and the reverse resistance of the rectifier 331 is sufficiently great, so that current may flow only in one direction.

The smoothing circuit 332 may output the stable DC current by removing a ripple component from the DC output power of the rectifier 331.

The smoothing circuit 332 may include a capacitor for smoothing.

The power managing unit 360 may constantly maintain the power transmitted to the load 400 by adjusting the rectified DC power.

The power managing unit 360 may include a voltage restricting unit 361, a controller 362, and a modulating unit 363.

If the DC power output from the rectifying unit 330 is equal to or greater than a first threshold value, the voltage restricting unit 361 absorbs the DC power corresponding to the first threshold value or more to protect the load 400. According to one embodiment, the first threshold value may refer to the maximum voltage to prevent the load 400 from being damaged.

In other words, the power restricting unit 361 protects the load 400 by preventing the instant over voltage from being applied to the load 400.

According to one embodiment, the voltage limiting unit 361 may include a Zener diode. The Zener diode allows current to flow when more than predetermined voltage is applied thereto, and operates as being open when less than the predetermined voltage is applied thereto, so that current does not flow. Accordingly, the power loss hardly occurs within the voltage range allowed by the Zener diode. If the voltage restricting unit 361 includes the Zener diode, and if the DC voltage output from the rectifying unit 330 is equal to or greater than the first threshold value, current passes through the Zener diode, and the voltage, which is equal to or greater than the first threshold value, is prevented from being input to the load 400, so that the load 400 can be protected.

The controller 362 may detect DC power transmitted to the load 400 from the rectifying unit 330.

If the DC power transmitted to the load 400 is equal to or greater than the first threshold value, the controller 362 may detect that the DC power is equal to or greater than the first threshold value, generate a signal to adjust the power transmitted to the load 400, and transmit the signal to the modulation unit 363. According to one embodiment, the first threshold value may refer to the maximum voltage to prevent the load 400 from being damaged.

If the power corresponding to the first threshold value or more is continuously applied to the voltage restricting unit 361, the voltage restricting unit 361 and the load 400 may be damaged. Accordingly, the controller 362 generates a power decrease signal to decrease the power transmitted to the load 400, and transmits the power decrease signal to the modulation unit 363. The modulation unit 363 may receive the power decrease signal, and transmit the power decrease signal to the power supply device 100.

According to one embodiment, the modulation unit 363 may transmit the power decrease signal to decrease power, which is transmitted to the wireless power receiver 300, to the power supply device 100 through the in-band communication or the out-of band communication.

Thereafter, the power supply device 100 transmits reduced power to the wireless power transmitter 200, the reduced power, which has been received in the wireless power transmitter 200, is transmitted to the wireless power receiver 300, and the load 400 may receive power, which is less than the first threshold value, from the wireless power receiver 300. Accordingly, the over voltage, which is equal to or greater than the first threshold value, is prevented from being continuously applied to the load 400, thereby protecting the load 400.

The controller 362 may detect the DC power received in the load 400 if the DC power is less than the second threshold value. According to the embodiment, the second threshold value may be less than the first threshold value, and may refer to the minimum quantity of power required to normally operate the load 400. In other words, the controller 362 detects the DC power transmitted to the load 400 if the DC power is less than the second threshold value. The controller 362 may transmit a power increase signal to maintain the quantity of power transmitted in the load 400 to the second threshold value. The modulation unit 363 may receive the power increase signal and may transmit the received power increase signal to the power supply device 100.

According to one embodiment, the modulation unit 363 may transmit the power increase signal, which is used to increase the power transmitted to the wireless power receiver 300, to the power supply device 100 through the in-band communication or the out-band communication.

Thereafter, the power supply device 100 transmits increased power to the wireless power transmitter 200, the transmitted increase power is transmitted to the wireless power receiver 300, and the load 400 may receive constant power of the second threshold value from the wireless power receiver 300. Accordingly, the constant power of the second threshold value may be supplied to the load 400.

If the DC power received in the load 400 is equal to or greater than the second threshold value and less than the first threshold value, the controller 362 may detect the DC power received in the load 400 and transmit a power decreases signal to the modulation unit 363. The modulation unit 363 may transmit the received power decrease signal to the power supply device 100.

Thereafter, the power supply device 100 may transmit the decreased power to the wireless power transmitter 200, and the decreased power, which has been received in the wireless power transmitter 200, may be transmitted to the wireless power receiver 300. Then, the load 400 may receive the constant power corresponding to the second threshold value from the wireless power receiver 300. Accordingly, the constant power corresponding to the second threshold value can be provided to the load 400.

The modulation unit 363 may receive the power increase signal, which is used to increase the quantity of power supplied to the wireless power transmitter 200 from the power supply device 100, or the power decrease signal, which is used to decrease the quantity of power supplied to the wireless power transmitter 200 from the power supply apparatus 100, from the controller 362 and transmits the power increase signal and the power decrease signal to the power supply device 100.

The modulation unit 363 may receive a power shut-off signal, which is used to shut off power supplied to the wireless power transmitter 200 from the power supply device 100, from the controller 362 and may transmit the power shut-off signal to the power supply device 100.

The modulation unit 363 may transmit the state of the power, which is received by the wireless power receiver 300, to both of the power supply device 100 and the wireless power transmitter 200.

Figure 8:
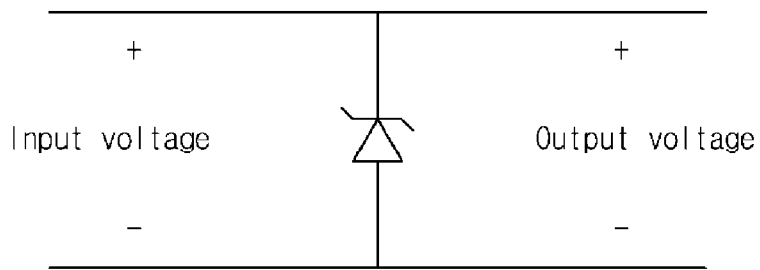
FIG. 8 is a view showing a voltage restricting unit which is a component of the wireless power receiver according to still another embodiment.

According to one embodiment, the modulation unit 363 may transmit the power increase signal, the power decrease signal, the power shut-off signal, and the state information of the wireless power receiver 300 to the power supply device 100 through the in-band communication or the out-band communication. FIG. 8 is a view showing an example of the voltage restricting unit 361, which serves as a component of the wireless power receiver 300, according to another embodiment.

Referring to FIG. 8, the voltage restricting unit 361 includes a Zener diode.

The Zener diode allows current to flow when more than predetermined voltage is applied thereto, and operates as being open when less than the predetermined voltage is applied thereto, so that current does not flow. Accordingly, the power loss hardly occurs within the voltage range allowed by the Zener diode.

In other words, although power loss may occur in a transient state, power loss may not occur in a steady state. The transient state may refer to the state that over voltage is continuously applied to the voltage restricting unit 361, and the steady state may refer to the state that normal voltage is continuously applied to the load 400 instead of the over voltage.

Since the transient state occurs only for the very short time, power loss is not greatly represented. Accordingly, the power transmission efficiency is higher than that of the case of using the DC-DC converter 350 of FIG. 5.

In addition, when the Zener diode is used as the voltage restricting unit 361, since the impedance obtained when seen from the input terminal of the Zener diode to the load 400 is not varied, the power transmission efficiency is prevented from being deteriorated.

Figure 9:
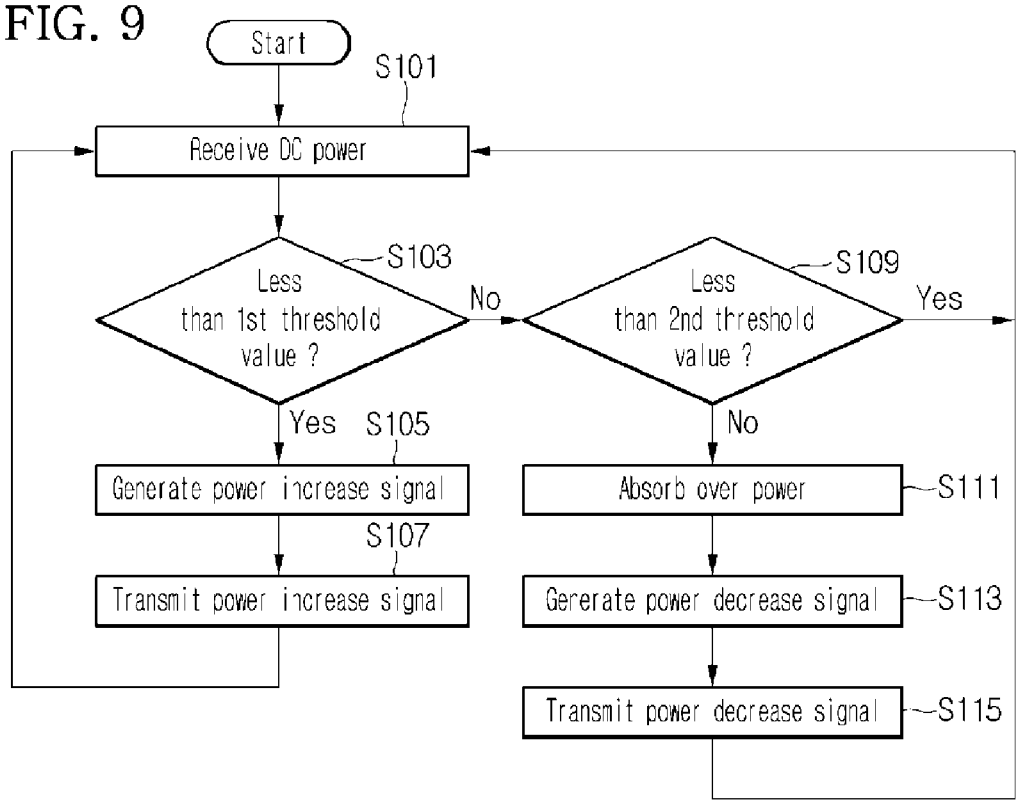
FIG. 9 is a flowchart showing a method of managing power of the wireless power receiver according to one embodiment.

FIG. 9 is a flowchart showing a method of managing power in the wireless power receiver 300 according to one embodiment.

The structure of the wireless power receiver 300 has been described with reference to FIG. 7.

First, the power supply device 100 supplies AC power to the wireless power transmitter 200. The power supply device 100 may include an AC power source to supply AC power having a predetermined frequency.

The wireless power transmitter 200 receives the AC power from the power supply device 100, and transmits the supplied AC power to the wireless power receiver 300. According to one embodiment, the scheme of transmitting power from the wireless power transmitter 200 to the wireless power receiver 300 may include the electromagnetic induction scheme or the resonance scheme.

The rectifying unit 330 of the wireless power receiver 300 rectifies AC power to DC power to be output to the power managing unit 360. The power managing unit 360 may include the voltage restricting unit 361, the controller 362, and the modulation unit 363. The details thereof have been described with reference to FIGS. 7 and 8.

The power managing unit 360 receives rectified DC power (step S101).

Thereafter, the power managing unit 360 determines if the rectified DC power is less than the first threshold value (step S103). According to one embodiment, the first threshold value may refer to the minimum quantity of power required to normally operate the load 400. The power managing unit 360 may detect DC power output thereto through the controller 362.

If the rectified DC power is determined as being less than the first threshold value, the power managing unit 360 may generate the power increase signal to maintain the DC power to the first threshold value through the controller 362 (step S105). In other words, the power managing unit 360 may generate the power increase signal in order to receive increased power from the wireless power transmitter 200 such that the normal power is transmitted to the load 400.

Thereafter, the power managing unit 360 may transmit the power increase signal, which is generated through the modulation unit 363, to the power supply device 100 (step S107). In other words, the power managing unit 360 transmits the power increase signal to the power supply device 100 through the modulation unit 363, so that the power supply device 100 can increase the power supplied to the wireless power transmitter 200. Therefore, the power managing unit 360 increases the power received from the transmitter 200 to supply the power corresponding to the first threshold value to the load 400.

If the rectified DC power is determined as being equal to or greater than the first threshold value, the power managing unit 360 determines if the rectified DC power is less than the second threshold value (step S109). According to one embodiment, the second threshold value is greater than the first threshold value, and may refer to the maximum power to prevent the load 400 from being damaged.

If the rectified DC power is determined as being equal to or greater than the second threshold value, the power managing unit 360 absorbs over voltage (step S111). The power managing unit 360 may absorb the over voltage equal to or greater than the second threshold value through the voltage restricting unit 361. The voltage restricting unit 36 may include a Zener diode according to one embodiment. Accordingly, the power managing unit 360 may prevent over voltage from being transmitted to the load 400.

Thereafter, the power managing unit 360 may generate the power decrease signal, which is used to maintain the DC power to the first threshold value, through the controller 362 (step S113).

Thereafter, the power managing unit 360 may transmit the power decrease signal, which is generated through the modulation unit 363, to the power supply device 100 (step S115). In other words, the power managing unit 360 transmits the power increase signal to the power supply device 100 through the modulation unit 363, so that the power supply device 100 may decrease the power supplied to the wireless power transmitter 200. Therefore, the power managing unit 360 decreases power transmitted from the transmitter so that the power corresponding to the first threshold value may be supplied to the load 400.

If the rectified DC power is determined as being less than the second threshold value, step S101 is returned.

Hereinafter, the wireless power receiver according to still another embodiment will be described with reference to FIGS. 10 to 13.

Figure 10:
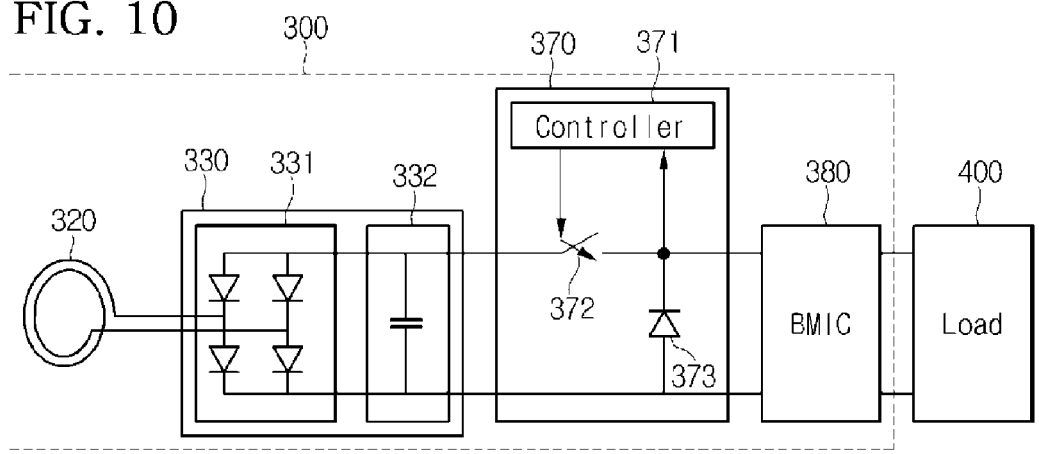
FIG. 10 is a view showing the structure of the wireless power receiver according to still another embodiment.

FIG. 10 is a block diagram showing the structure of the wireless power receiver according to still another embodiment.

Referring to FIG. 10, the wireless power receiver 300 may include the reception induction coil 320, the rectifying unit 330, the power managing unit 370, and the battery management IC (BMIC) 380.

According to one embodiment, if the wireless power receiver 300 receives power from the wireless power transmitter 200 through resonance, the wireless power receiver 300 may further include the reception resonance coil 310. According to one embodiment, if the wireless power receiver 300 receives power from the wireless power transmitter 200 through the electromagnetic induction, the wireless power receiver 300 may not further include the reception resonance coil 310.

The reception induction coil 320 receives power from the transmitter. In detail, the reception induction coil 320 may receive power through the electromagnetic induction or the resonance. The power received by the reception induction coil 320 may be AC power.

The rectifying unit 330 may convert the AC power received by the reception induction coil 320 into the DC power, and the detail of the rectifying unit 330 have been described with reference to FIG. 7.

The power managing unit 370 may adjust the DC power transmitted from the rectifying unit 330 to the BMIC 380. In detail, the power managing unit 370 may shut off the power transmitted to the load 400 if the rectified DC power is greater than or equal to a threshold value.

The power managing unit 370 may include a controller 371, a switch 372, and a diode 373.

If the DC power output from the rectifying unit 330 is equal to or greater than the threshold value, the diode 373 absorbs the power corresponding to the threshold value or more to protect the BMIC 380. According to the embodiment, the diode 373 may include a Zener diode. The Zener diode allows current to flow when more than a predetermined voltage is applied thereto, and operates as being open when less than the predetermined voltage is applied thereto, so that current does not flow.

If the DC power transmitted from the rectifying unit 330 to the BMIC 380 is equal to or greater than the threshold value, the controller 371 may detect that the DC power transmitted from the rectifying unit 330 to the BMIC 380 is equal to or greater than the threshold value, and transmits an open signal to the switch 372. Since the diode 373 may be damaged if the power corresponding to the threshold value or more is continuously applied to the diode 373, the controller 371 detects the power corresponding to the threshold voltage or more and transmits the open signal to the switch 372 to open the switch 372.

If the DC power transmitted from the rectifying unit 330 to the BMIC 380 is less than the threshold value, the controller 371 may detect that the DC power transmitted from the rectifying unit 330 to the BMIC 380 is less than the threshold value, and transmit a short signal to the switch 372 so that the switch 372 is shorted.

In other words, if the DC current applied to the BMIC 380 is equal to or greater than the threshold value, the power managing unit 370 allows the diode 373 to absorb instant overpower and then opens the switch 372 through the controller 371 to prevent the BMIC 380 from being damaged due to the overpower.

The controller 371 may include an amplifier, and the details thereof will be described below with reference to FIG. 11.

The BMIC 380 adjusts the DC power output from the power managing unit 370 and supplies the adjusted DC power to the load 400. According to one embodiment, the load 400 may refer to a battery. Since the quantity of current charged in the load 400 is varied according to the DC voltage applied to both terminals of the load 400, the BMIC 380 adjusts the DC power and supplies the adjusted DC power to the load 400 so that the load 400 can be charged with predetermined DC current.

Figure 11:
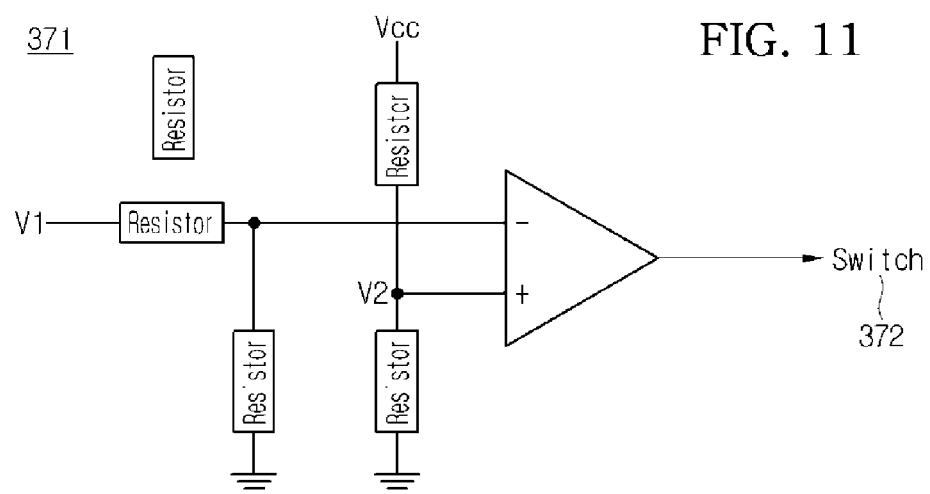
FIG. 11 is a view showing the structure of a controller according to one embodiment.

FIG. 11 is a view showing the structure of the controller 371 according to one embodiment.

The controller 371 may include a comparator including an amplifier and a plurality of resistors.

The comparator measures the difference between input voltage V1 and reference voltage V2 to control the operation of the switch 372. The input voltage V1 may be voltage applied to the BMIC 380.

If the difference between the input voltage V1 and the reference voltage V2 is over voltage which is equal to or greater than a threshold value, the controller 371 may open the switch 372 to protect the BMIC 380.

If the difference between the input voltage V1 and the reference voltage V2 is less than the threshold value, the controller 371 may short the switch 372 to transmit the DC voltage, which is output from the rectifying unit 330, to the BMIC 380.

Figures 12, 13:
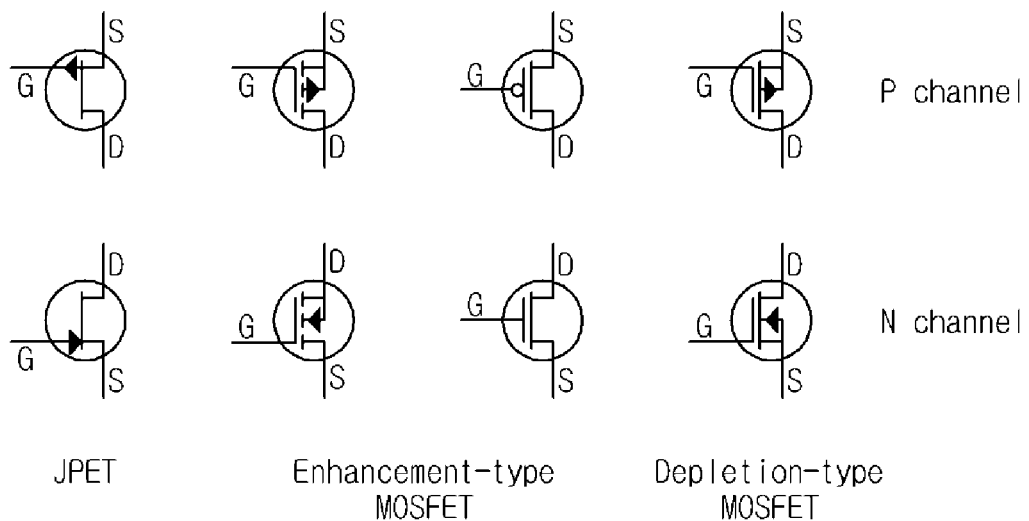
FIG. 12 is a view showing various structures of a switch according to one embodiment.
FIG. 13 is a view showing the structure, the cost, and the efficiency according to the cases that the power managing unit and the DC-DC converter are used.

FIG. 12 is a view showing various structures of the switch 372 according to one embodiment.

As shown in FIG. 8, the switch 373 constituting the power managing unit 370 may include various of metal oxide semiconductor field-effect transistors (MOSFETs).

The MOSFETs include channels including P type and N type materials, and are classified into NMOSFETs, PMOSFETs, and CMOSFETs according to the materials.

Each MOSFET includes a gate terminal, a source terminal, and a drain terminal, and may serve as a switch through the voltage of the gate terminal.

FIG. 13 is a view showing the structure, the cost, and the efficiency according to the cases that the power managing unit 370 and the DC-DC converter 350 are used.

As shown in FIG. 5, the DC-DC converter 350 may include a switching regulator or a linear regulator.

The switching regulator is a converter to adjust the output voltage through a pulse width modulation (PWM). In the case of the switching regulator, although the power transmitted to the BMIC 380 represents 90% of power efficiency, the complex structure thereof causes the high cost in the low-power supply and requires an inductor having a high value.

The LDO linear regulator is a converter to receive input voltage, provide output voltage by the required quantity, and discharge remaining voltage as heat. The LDO linear regulator is useful when the difference between input and output voltages is not great. However, if the difference between the input and output voltages is great, the efficiency may be significantly deteriorated, and the great quantity of heat may be generated. Although the LDO linear regulator requires low cost due to the simple structure thereof, 80% of power efficiency is represented, which is lower than the power efficiency of the switching regulator.

According to the embodiment, since the power managing unit 370 includes the switch 372 and the diode 373, the structure of the power managing unit 370 is simple and the cost thereof is inexpensive.

In addition, if normal DC power is applied to the BMIC 380 instead of over power, the power loss is slightly represented in the switch 372 and the diode 373. In addition, 95% of power efficiency is represented, which is higher than that of the switching regulator and the LDO linear regulator.

In detail, if the diode 373 includes a Zener diode, and if the normal power is applied to the BMIC 380 instead of over power, since the leakage current flowing through the Zener diode is slight, the leakage current is negligible. According to one embodiment, the leakage current flowing through the Zener diode may be 10 uA or less for the illustrative purpose.

If the switch 372 includes an MOSFET, the quantity of dropped voltage is slight as about 0.2 V. In this case, the quantity of 0.2 V is provided only for the illustrative purpose. If the DC voltage output from the rectifying unit 330 is 5V, the rate of the power loss is 0.2/5, that is, about 4%.

In other words, if the power managing unit 370 according to the embodiment is applied to the wireless power receiver 300, since the slight quantity of power is lost in the switch 372 and the diode 373, the power transmitted to the BMIC 380 is increased, so that the total power efficiency may be increased.

A power transmission method of the wireless power receiver according to the disclosure may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A receiver to wirelessly receive power from a transmitter and transfer the power to a load, the receiver comprising:
a receiving unit to receive AC power through a resonance frequency band from the transmitter;
a rectifying unit to rectify the received AC power to DC power;
a DC-DC converter to convert the rectified DC power into a specific DC power required by the load;
a voltage restricting unit disposed before the load; and
a controller to:
detect a first rectified DC power, which is rectified from the received AC power, that is less than a predetermined threshold to prevent an instant overvoltage from being transferred to the load,
transmit, via a modulation unit, a signal to increase the AC power to be received from the transmitter and control the voltage restricting unit to allow the detected first rectified DC power to be transferred to the load in response to the detected first rectified DC power being less than the predetermined threshold,
detect a second rectified DC power, which is rectified from the received AC power, that is equal to or greater than the predetermined threshold to prevent the instant overvoltage from being transferred to the load, and
transmit, via the modulation unit, a signal to decrease the AC power to be received from the transmitter and control the voltage restricting unit to prevent the detected second rectified DC power from being transferred to the load in response to the detected second rectified DC power being equal to or greater than the predetermined threshold,
wherein the predetermined threshold is different than a charge quantity of the load.

2. The receiver of claim 1, wherein the voltage restricting unit prevents the instant overvoltage from being transferred to the load by absorbing the power.

3. The receiver of claim 1, wherein the voltage restricting unit prevents the instant overvoltage from being transferred to the load by using a switch which maintains or shuts off the power transferred to the load.

4. The receiver of claim 3, wherein the voltage restricting unit shorts the switch to allow the detected first rectified DC power to be transferred to the load in response to the detected first rectified DC power being less than the predetermined threshold and opens the switch to prevent the instant overvoltage from being transferred to the load in response to the detected second rectified DC power being equal to or greater than the predetermined threshold.

5. The receiver of claim 3, wherein the controller includes a comparator circuit including an amplifier and a plurality of resistors, and
wherein the comparator circuit determines if the detected first and second rectified DC power is equal to or greater than the predetermined threshold to control an operation of the switch.

6. The receiver of claim 1, wherein the voltage restricting unit prevents the instant overvoltage from being transferred to the load by using a Zener diode which absorbs the power.

7. The receiver of claim 1, wherein the receiving unit includes a reception induction coil to receive the AC power from the transmitter using electromagnetic induction.

8. The receiver of claim 1, wherein the receiving unit includes a reception resonant coil to receive the AC power from the transmitter using resonant coupling.

9. The receiver of claim 1, wherein the rectifying unit includes at least one of a rectifier to convert the received AC power to the DC power or a smoothing circuit to remove a ripple component from the converted DC power, and the rectifier includes a bridge diode.

10. The receiver of claim 1, wherein the controller prevents the instant overvoltage from being transferred to the load even though the battery is less than fully charged and the load is still receiving power from the transmitter.

11. The receiver of claim 1, wherein the modulation unit is further configured to transmit the signal directly to the transmitter.

12. A method for managing power in a receiver to wirelessly receive the power from a transmitter and transfer the power to a load, the method comprising:
receiving AC power through a resonance frequency band from the transmitter;
rectifying the received AC power to DC power via a rectifying unit;
managing the power transmitted to the load based on the rectified DC power; and converting, via a DC-DC converter, the rectified DC power into a specific DC power required by the load, wherein managing the power includes:

detecting, via a controller, a first rectified DC power, which is rectified from the received AC power, that is less than a predetermined threshold to prevent an instant overvoltage from being transferred to the load;

transmitting, via a modulation unit, a signal to increase the AC power to be received from the transmitter and controlling the voltage restricting unit to allow the detected first rectified DC power to be transferred to the load in response to the detected first rectified DC power being less than the predetermined threshold;

detecting, via the controller, a second rectified DC power, which is rectified from the received AC power, that is equal to or greater than the predetermined threshold to prevent the instant overvoltage from being transferred to the load; and transmitting, via the modulation unit, a signal to decrease the AC power to be received from the transmitter and controlling the voltage restricting unit to prevent the detected second rectified DC power from being transferred to the load in response to the detected second rectified DC power being equal to or greater than the predetermined threshold, wherein the predetermined threshold is different than a charge quantity of the load.

13. The method of claim 12, further comprising:
controlling the voltage restriction unit to prevent the instant overvoltage from being transferred to the load by absorbing the power.

14. The method of claim 13, wherein the voltage restricting unit includes a Zener diode which absorbs the power to prevent the instant overvoltage from being transferred to the load.

15. The method of claim 12, wherein the voltage restriction unit includes a switch which maintains or shuts off the power transferred to the load to prevent the instant overvoltage from being transferred to the load.

16. The method of claim 15, further comprising:
controlling the voltage restriction unit to short the switch to allow the detected first rectified DC power to be transferred to the load in response to the detected first rectified DC power being less than the predetermined threshold and open the switch to prevent the instant overvoltage from being transferred to the load in response to the detected second rectified DC power being equal to or greater than the predetermined threshold.

* * * * *